(12) United States Patent
Masa (10) Patent No.: US 8,847,145 B2
(45) Date of Patent: Sep. 30, 2014

(54) METHOD FOR WORKING OUT THE ANGULAR POSITION OF A ROTATING ELEMENT AND DEVICE FOR CARRYING OUT SUCH A METHOD

(75) Inventor: Peter Masa, Onnens (CH)

(73) Assignee: CSEM Centre Suisse d'Electronique et de Microtechnique SA—Recherche et Developpement, Neuchatel (CH)

(*) Notice: Subject to any disclaimer, the term of this patent is extended or adjusted under 35 U.S.C. 154(b) by 194 days.

(21) Appl. No.: 13/547,669

(22) Filed: Jul. 12, 2012

(65) Prior Publication Data

US 2013/0015338 A1    Jan. 17, 2013

(30) Foreign Application Priority Data

Jul. 13, 2011 (CH) ...................................... 1175/11
Sep. 29, 2011 (EP) ...................................... 11183313

(51) Int. Cl.
  *G01D 5/34* (2006.01)
  *G01D 5/38* (2006.01)
  *G01D 5/28* (2006.01)

(52) U.S. Cl.
  CPC . *G01D 5/285* (2013.01); *G01D 5/38* (2013.01)
  USPC ...................... 250/231.13; 341/13; 250/237 G (58) Field of Classification Search
  USPC ...................... 250/231.13–231.18; 341/13, 14
  See application file for complete search history.

(56) References Cited

U.S. PATENT DOCUMENTS

| 5,983,720 | A  | * | 11/1999 | Crabb et al. ................ 73/514.26 |
| 6,188,058 | B1 |   | 2/2001  | Tullis |
| 6,476,405 | B1 |   | 11/2002 | Henshaw |
| 7,183,537 | B2 | * | 2/2007  | Thorburn .................. 250/231.13 |
| 7,858,922 | B2 | * | 12/2010 | Holzapfel et al. ........ 250/231.13 |
| 8,395,111 | B2 | * | 3/2013  | Phan Le .................... 250/231.13 |
| 2004/0227065 | A1 | * | 11/2004 | Thorburn .................. 250/231.13 |
| 2005/0105081 | A1 |   | 5/2005  | Odell |

FOREIGN PATENT DOCUMENTS

| DE | 3939905 A1 | 6/1991 |
| EP | 1106972 | 6/2001 |
| EP | 2251641 A1 | 11/2010 |
| JP | 2007064949 A | 3/2007 |

OTHER PUBLICATIONS

European Search Report, dated Sep. 16, 2013, from corresponding EP application.
European Search Report dated Oct. 21, 2013; Application No. 11183313.3.

* cited by examiner

*Primary Examiner* — Tony Ko
(74) *Attorney, Agent, or Firm* — Young & Thompson (57) ABSTRACT

Method for working out the angular position of a rotating element, using at least one light source emitting a light beam in the direction of a fixed sensor and computing elements for processing an output signal of the sensor, includes:
 arranging the light source with respect to the rotating element and the sensor so as to induce an interaction between the light beam and the sensor which depends on the angular position of the rotating shaft,
 arranging on the path of the light beam, in a fixed position with respect to the sensor, a perforated mask which presents a repetitive pattern of perforations,
 detecting shadows generated by the mask on the sensor,
 processing the output signal of the sensor for determining the position of the shadows on the sensor, and
 computing the angular position of the rotating element using the position of the shadows.

19 Claims, 7 Drawing Sheets

//  METHOD FOR WORKING OUT THE ANGULAR POSITION OF A ROTATING ELEMENT AND DEVICE FOR CARRYING OUT SUCH A METHOD

TECHNICAL FIELD

The present invention relates to the technical field of the determination with high precision of the angular positions of a rotational part or element, for instance a shaft, with respect to a fixed frame or structure. Devices such as optical encoders, such as end-of-shaft encoders, which allow such a determination, are already used for instance in the field of electric actuators or motors.

The present invention concerns more particularly a method for determining a reliable angular position of a rotating shaft with a very high accuracy.

The present invention concerns also a device for carrying out the above mentioned method.

BACKGROUND OF THE INVENTION

In an application concerning a device for determining the angular position of a rotating shaft, which is disclosed in document DE 39 39 905, an angular position with high resolution and/or an absolute angular position with respect to a fixed part, can be obtained. The device comprises a fixed light source emitting a light beam in the axial direction of the shaft toward a slanted mirror which is integral in rotation with the shaft. The device comprises also at least one ring-shaped sensor which is concentric with the axial direction and on which the reflected light beam hits.

However, a main drawback of such a device is that the positioning of the sensor with respect to the axis needs to be very precise. The costs resulting of such a positioning operation, is very high. The accuracy of the measured values, which is based on the position of a sole light point, is anyway not very precise. The cost of a ring-shaped sensor or multiple sensor arrangement is also very expensive. In addition, such a device cannot be made very small.

SUMMARY OF THE INVENTION

Consequently, an object of the present invention is to propose a new method for determining the angular position of a rotating element, which does not present the aforementioned drawbacks.

The object of the present invention is therefore to propose a new method for determining the angular position of a rotating element which is reliable and very precise.

Another object of the present invention is to propose a novel device for determining the angular position of a rotating element which is reliable and very precise although presenting large positioning tolerances for its constitutive parts during their mounting.

Another object of the present invention is to propose a novel device for determining the angular position of a rotating element which is very compact.

Another object of the present invention is to propose a novel device for determining the angular position of a rotating element which works at very high rotation speeds, for instance higher than 500,000 rpm.

Another object of the present invention is to propose a novel device for determining the angular position of a rotating element which is unexpensive especially in its manufacturing and mounting costs.

Another object of the present invention is to propose a novel device for measuring the rotating quality of a rotating axis. In other words, the device can measure if the rotation follows a perfect circle or not.

Another object of the present invention is to propose a novel device for diagnosing wear-out by measuring the mechanical degradation over time of a rotating element.

The objects given to the invention are achieved with the help of a method for working out the angular position of a rotating element which is mounted in a fixed frame, consisting in using at least one light source emitting a light beam in the direction of a fixed sensor and using computing means for processing an output signal of the sensor, characterized in that it consists in:

a) positioning the light source with respect to the rotating element and of the sensor in a way so as to induce an interaction between the light beam and the sensor which depends on the angular position of the rotating shaft, b) positioning on the path of the light beam, in a fixed position with respect to the sensor, a mask which presents a repetitive two dimensional pattern of transparent and opaque areas, c) detecting the image or shadows generated by the mask on the sensor, d) processing the output signal of the sensor for determining the position of the image or shadows on the sensor, and e) computing the angular position of the rotating element by using the position of the image or shadows on the sensor.

In the present description, the term "consist" should be interpreted in a non limiting way and with the same meaning as the term "comprise".

In an example of carrying out the method in accordance with the invention, it consists in using a fixed light source and a reflection of the light beam on a slanted and polished end of the rotating element.

In another example of carrying out the method in accordance with the invention, it consists in using a fixed light source and a reflection of the light beam on a mirror which is fixed in a tilted position with respect to the rotation axis on an end of the rotating element.

In another example of carrying out the method in accordance with the invention, it consists in using two fixed light sources emitting each a light of different color, the end of the rotating element, which faces the mask, presenting a slanted and polished surface for reflecting the two beams of light.

In another example of carrying out the method in accordance with the invention, it consists in using one mobile light source arranged in an off-centered position on a disc which is integral in rotation with the rotating element and of driving into rotation the disc in a plane parallel to the mask.

In another example of carrying out the method in accordance with the invention, it consists in using two mobile light sources emitting each a light of different color on a disc which is integral in rotation with the rotating element, the light sources being fixed in an off-centered and diametrically opposite positions and of driving into rotation the disc in a plane parallel with the mask.

In an implementation in accordance with the invention, the method consists in using an absolute code integrated in the regular two dimensional pattern, in order to identify absolute position on the mask.

The objects given to the invention are also achieved with the help of a device for carrying out the above mentioned method, providing the angular position of a rotating element which is able to rotate in a fixed frame, comprising at least one point-source LED kind light source, emitting a light beam, optical transmission means localized on the path of the light beam and influencing the light beam in dependence of the angular position of the rotating shaft, a sensor comprising a pixel array which is hit by the influenced light beam and processing and computing means for providing the angular position of the rotating element by using the output signal of the sensor, characterized in that the optical transmission means comprise: a mask which presents a repetitive two dimensional pattern of transparent and opaque areas and which is arranged in a spaced and fixed position covering the sensor and which is parallel to the sensor, in order to generate on the sensor the image or shadows of the mask, and communication means for providing the processing and computing means with the output signal of the sensor in order to determine the position of the image or shadows of the mask and to compute the angular position of the rotating element.

By point light source, we mean a light source whose emitting surface is small compared to the distance which separates it from the sensor, and which has diverging light rays, that is, non-parallel light rays.

The transparent areas of the mask are constituted for instance of perforations or holes or of a transparent material such as glass.

In an embodiment of the device in accordance with the invention, the repetitive two dimensional pattern comprises an absolute code for identifying the absolute position on the mask. This allows in case that the measured points move a lot, to recognize their precise position with respect to a reference which is also integrated in said code.

In an embodiment of the device in accordance with the invention, the light source is arranged in a fixed position on the mask, aligned with the rotation axis of the rotating element and facing a slanted and polished end of the rotating element for reflecting the light beam.

In an embodiment of the device in accordance with the invention, at least one light source is arranged in at least one fixed position in the plane of the sensor and nearby the sensor, the end of the rotating element facing the mask, presenting a slanted and polished surface for reflecting the light beam.

In an embodiment of the device in accordance with the invention, it comprises two light sources, each light source emitting a light of different color, each light source being arranged in a fixed an off-centered position in the plane of the sensor, nearby one side of the sensor, the end of the rotating element which faces the mask, presenting a slanted and polished surface for reflecting the two beams of light.

In an embodiment using two light sources of different colors, the sensor comprises areas covered with different optical filters in order to differentiate the images or shadows generated by the light sources. Alternatively, the sensor could comprise a filter per pixel.

In an embodiment of the device in accordance with the invention, it comprises two light sources, each light source emitting a light of different color, each light source being arranged in a fixed an off-centered position on the mask, the end of the rotating element which faces the mask, presenting a slanted and polished surface for reflecting the two beams of light.

In an embodiment of the device in accordance with the invention, the light source is arranged in a fixed position on the mask, aligned with the rotation axis of the rotating element and facing a tilted mirror fixed on the end of the rotating element for reflecting the light beam.

In an embodiment of the device in accordance with the invention, it comprises one mobile light source, arranged in a fixed, off-centered position on a disc which is orthogonal to the rotating element, the disc being integral in rotation with the rotating element and parallel to the plane of the mask.

In another embodiment of the device in accordance with the invention, it comprises two light sources, each light source emitting a light of different color, the light sources being arranged in fixed, off-centered and diametrically opposite positions, on a disc which is integral in rotation with the rotating element and which is parallel with the plane of the mask.

In an embodiment of the device in accordance with the invention, the communication means, the computing means and the processing means are integrated in the sensor.

Another advantage of the invention is the possibility to measure how precisely the axis is turning. Because of mechanical imperfections, for example in the ball bearings, the axis does not describe a perfect circle. Thus, by fitting a circle on a set of $(x_T, y_T)$ compensated and measuring statistically how much the measurements deviate from the fitted circle, the method can estimate the quality of the rotating device. In addition, this measurement can be repeated over time, to estimate the wear out of the rotating device. It is the possible to trigger an alarm as soon as the rotating device is wearing out too much, that it, as soon as the mean distance from the fitted circle to the measurements is above a predetermined threshold.

An advantage of the device in accordance with the invention lies in its very large versatility. The device in accordance with the invention fits well with many different technical applications especially in the field of rotary encoders for end-of-shaft arrangements.

Another advantage of the device in accordance with the invention lies in the fact that its constitutive parts can be mounted with very large mounting tolerances.

Another advantage of the device in accordance with the invention lies in that it can comprise a small sized sensor. The photosensitive area of the sensor has for instance a surface as small as 1 mm$^2$ and can provide a high resolution and measurement accuracy.

The device in accordance with the invention comprising two light sources, provides a precise and absolute angular position without using any calibration means or when the rotation axis drifts during operation. The line crossing the two positions of the light sources provides the absolute angular position of the rotating element or shaft. The angular position of the rotating element is thus independent of the position of the axis during operation.

Another advantage of the device in accordance with the invention lies in that the mask is fixed to the sensor, enhancing so its thermal and mechanical stability. Additionally, no imaging lens is needed, resulting in a lowering of the costs of the device. The fact that no plastic parts are needed will allow operation in a high temperature environment.

BRIEF DESCRIPTION OF THE DRAWINGS

The invention and its advantages also appear in greater detail from the following description of an embodiment given by way of illustration and with reference to the accompanying figures in which.

DETAILED DESCRIPTION

Elements that are structurally and functionally identical, and that are present in more than one distinct figure or illustration, are given the same numeric or alphanumeric reference in each of them.

Figure 1:
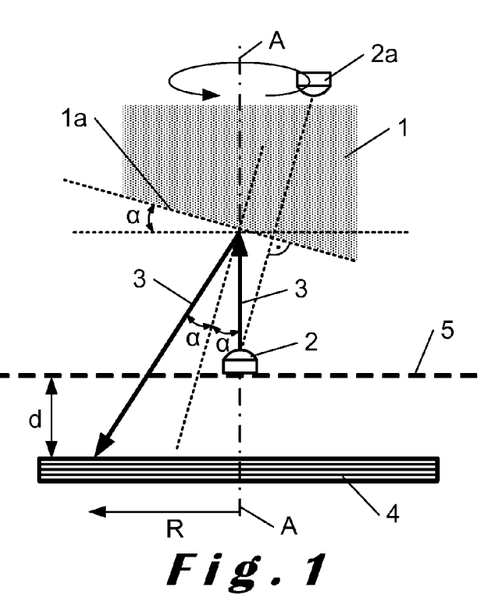
FIG. 1 is a schematic illustration of a first embodiment of a device in accordance with the invention.

FIG. 1 illustrates a first embodiment of a device in accordance with the invention, for providing the angular position of a rotating element 1 such as a shaft, which is able to rotate in a fixed frame. The device comprises a point-light source 2, which may be a Light Emitting Diode (LED), emitting a light beam 3.

The device comprises also optical transmission means localized on the path of the light beam 3 and influencing the light beam 3 in dependence on the angular position of the rotating element 1.

The device comprises also a sensor 4 extending in a plane which is orthogonal to the rotation axis A of the rotating element 1. The sensor 4 comprises a pixel array which is hit by the influenced light beam 3.

The device comprises also processing and computing means for providing the angular position of the rotating element 1 by using the output signal of the sensor 4.

The optical transmission means comprise a mask 5 which presents a two dimensional repetitive pattern of transparent and opaque areas and which is arranged in a spaced and fixed position covering the sensor 4 and which is parallel to the sensor 4, in order to generate on the sensor 4, shadows forming the image of the mask 5.

The optical transmission means comprise also communication means for providing the processing and computing means with the output signal of the sensor 4 in order to determine the position of the image or shadow of the mask 5, and to compute the angular position of the rotating element 1. The mask 5 extends at a distance d from the sensor 4. The distance d is preferably comprised in a range of 0.1 mm to 5 mm, for example 0.5 mm.

The light source 2 is arranged in a fixed position on the mask 5, aligned with the rotation axis A of the rotating element 1 and facing a slanted and polished end 1a of the rotating element 1 for reflecting the light beam 3. The slanted and polished end 1a presents an angle α with respect to a fictive plane P which is orthogonal to the rotation axis A.

The fixed light source 2 can also be represented by a corresponding mobile virtual light source 2a, which in this case turns around the axis A.

Figure 2:
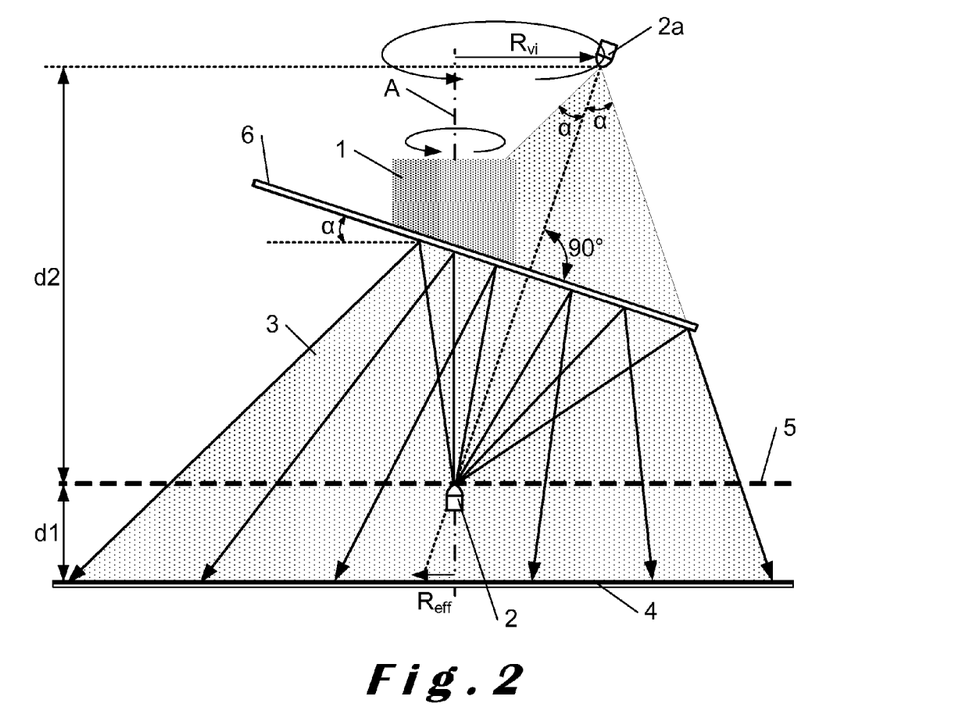
FIG. 2 is a schematic illustration of a second embodiment of a device in accordance with the invention.

FIG. 2 illustrates a second embodiment of a device in accordance with the invention, in which the light source 2 is arranged in a fixed position on the mask 5, aligned with the rotation axis A of the rotating element 1 and facing a tilted mirror 6 fixed on the end of the rotating element 1 for reflecting the light beam 3. The mirror 6 is advantageously fixed on the slanted end 1a of the rotating element 1.

In this embodiment, the mask 5 extends at a distance d1 from the sensor 4 and the virtual light source 2a turns in a plane which is located at a distance d2 from the mask 5.

Figure 3:
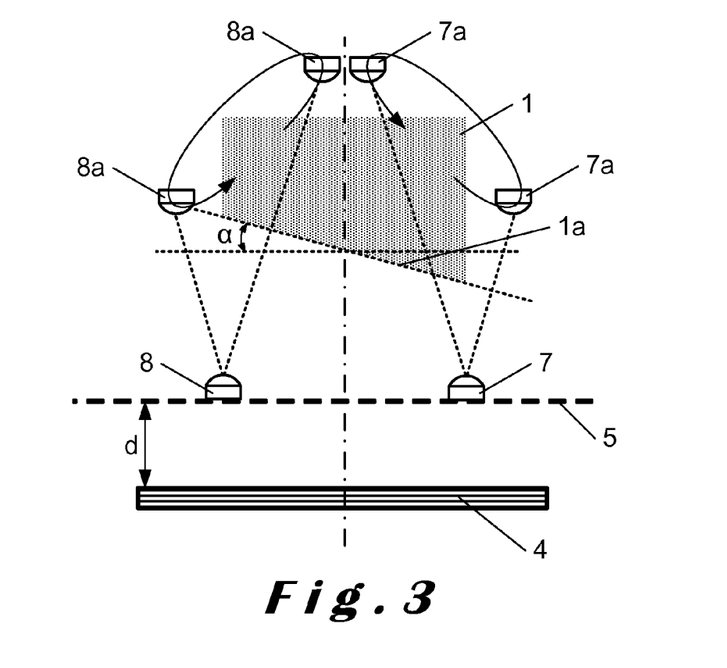
FIG. 3 is a schematic illustration of a third embodiment of a device in accordance with the invention.

In the embodiment of FIG. 3, the device comprises two light sources 7 and 8, each light source emitting a light of different color and being arranged in a fixed an off-centered position on the mask 5. The rotating element 1 faces the mask 5 with the surface of its slanted and polished end 1a, for reflecting the two emitted beams of light. The fixed light sources 7 and 8 can also be represented by mobile virtual light sources 7a and 8a which in this case are turning in tilted planes with respect to the rotation axis A.

Figure 4:
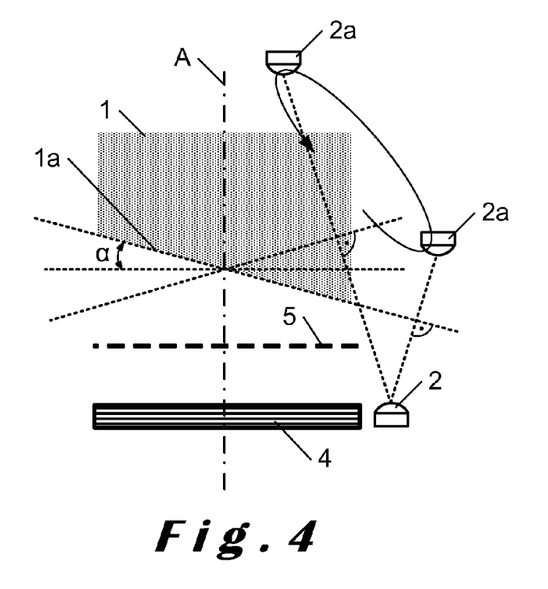
FIG. 4 is a schematic illustration of a fourth embodiment of a device in accordance with the invention.

In the embodiment of FIG. 4, the device comprises one light source 2 which is arranged in a fixed position in the extension plane of the sensor 4 and nearby the sensor 4. The rotating element 1 is facing the mask 5 with its slanted and polished end 1a for reflecting the emitted light beam. The fixed light source 2 can also be represented by a mobile virtual light source 2a which in this case is turning during the rotation of the rotating element 1, in a tilted plane with respect to the rotation axis A.

Figure 5:
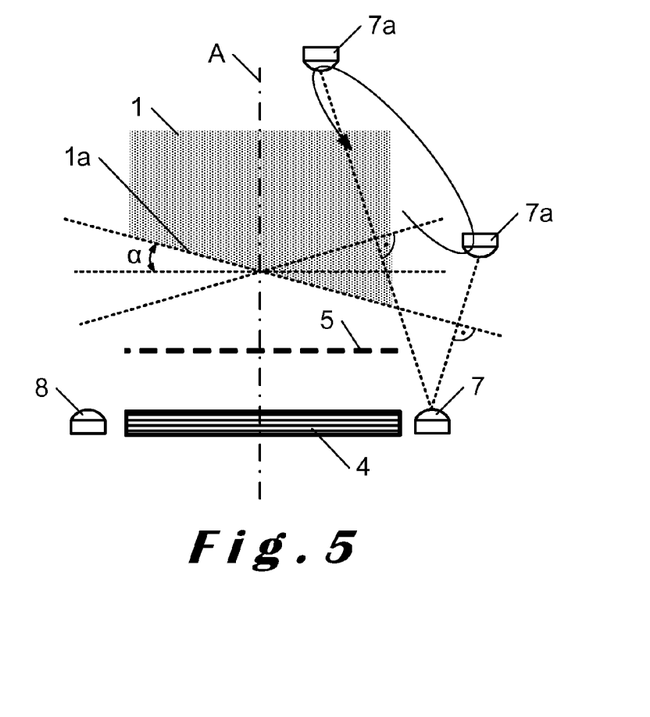
FIG. 5 is a schematic illustration of a fifth embodiment of a device in accordance with the invention.
Figure 6:
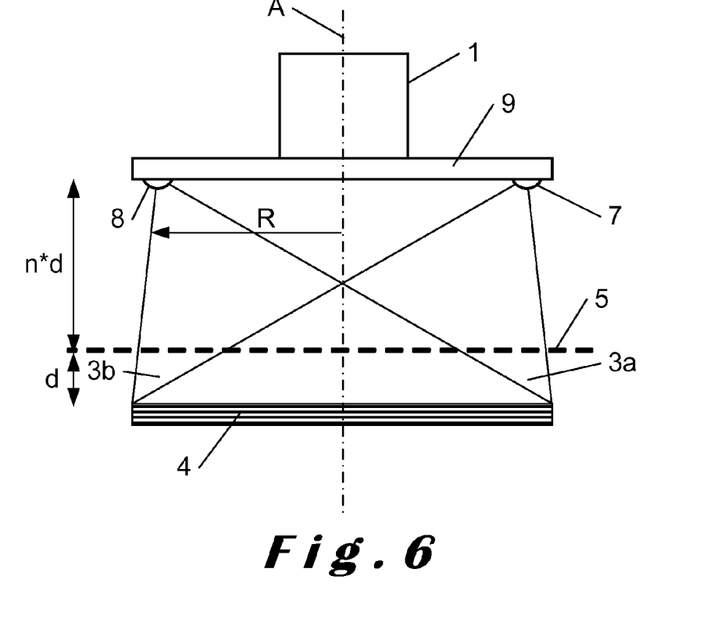
FIG. 6 is a schematic illustration of a sixth embodiment of a device in accordance with the invention.

In the embodiment of FIG. 5, the device comprises two light sources 7 and 8, each light source 7, 8 emitting a light of different color and being arranged in a fixed an off-centered position in the plane of the sensor 4, nearby a side of the sensor 4. The rotating element 1 faces the mask 5, with its slanted and polished end 1a for reflecting the two emitted beams of light. In the embodiment of FIG. 6, the device comprises two light sources 7,8, each light source emitting a light of different color. The light sources 7 and 8 are arranged in fixed, off-centered and diametrically opposite positions on a disc 9 which is integral in rotation with the rotating element 1 and which is parallel with the plane of the mask 5. The two emitted beams of light 3a and 3b are directed toward the mask 5 and the sensor 4.

In the embodiments using two distinct light sources of different colors, the sensor 4 or the mask 5, may comprise at least two areas covered each with a different optical filter, in order to differentiate the images or shadows generated by the distinct light sources and the mask 5.

As an alternative solution, the sensor 4 may comprise a color filter array, each pixel being covered with a different filter than its neighboring pixels, as it is used in a traditional color camera, in order to differentiate the images or shadows generated by the distinct light sources and the mask 5. In this alternative, the mask does not need a plurality of color filters.

The mask 5 may be metallic with a two dimensional pattern of holes. The shape of each hole is for instance rectangular and its dimensions are for instance between 10 μm and 200 μm, for example 50 μm.

Figure 7:
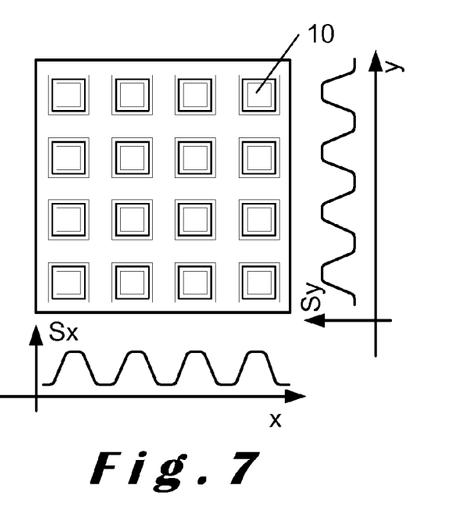
FIG. 7 is an illustration of an example of an image of a mask in an embodiment of the device in accordance with the invention.

The FIG. 7 is an illustration of an image of a mask 5 on the sensor 4. The image comprises a repetitive pattern of rectangular zones of light 10.

Figure 8:
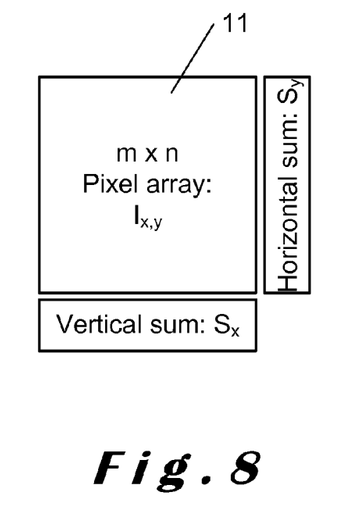
FIG. 8 is an illustration of an example of a pixel array which is used for providing an output signal of the sensor in a device in accordance with the invention.

The FIG. 8 is an illustration of an exemplary construction of the sensor 4. The sensor 4 comprises a pixel array 11 of m rows and n columns of pixels, on which is casted the image or shadows of the mask 5. The sensor 4 can so provide an output signal which depends on the angular position of the rotating element 1 by using the position of the image of the shadows.

In a two dimensional reference system X,Y, the coordinates x and y of a image or shadow point are obtained by measuring the signal Sx and the signal Sy respectively as schematically illustrated in FIG. 7.

The signal corresponding to column x=i is given by the sum of the pixel intensities I in the column i:

$$S_{x=i} = \sum_{y=1 \text{to} m} I_{i,y}$$

The signal corresponding to row y=j is given by the sum of the pixel intensities I in the row j:

$$S_{y=j} = \sum_{x=1 \text{to} n} I_{x,j}$$

Figure 9:
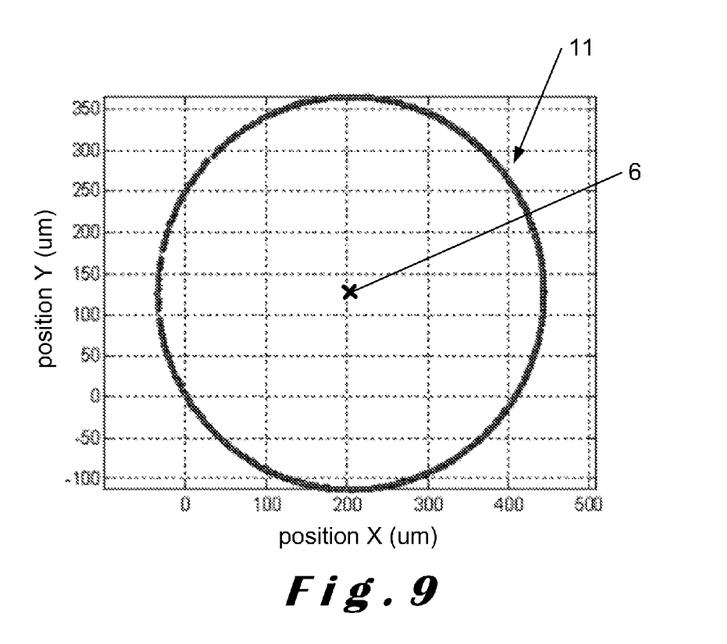
FIG. 9 is a exemplary representation of an example of an image illustrating successive positions of a shadow point on a sensor of the device in accordance with the invention.

The FIG. 9 is an illustration of an example of an image illustrating successive positions of an image or shadow point on the sensor 4 of the device in accordance with the invention during rotation of the rotating element 1. This image is assimilated to a fitted circle 11 in a two dimensional representation. The measurement unit of the horizontal and vertical axis is given in micrometers. The position of a point of an image, for instance a shadow with coordinates x and y follows a circular or an elliptical path. In FIG. 9 the circular path is the fitted circle 11. The computation of position x from signal Sx is well known in the art.

Figure 10:
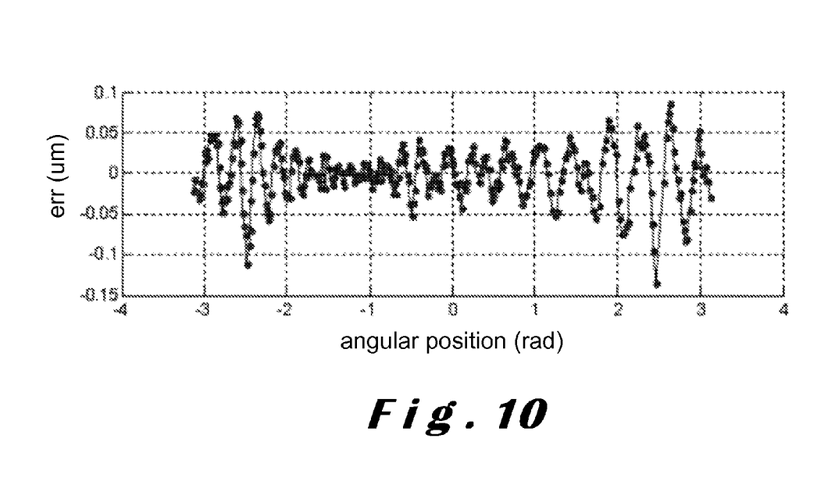
FIG. 10 is an exemplary representation of an error of positioning of shadow points with respect to a computed positions, in dependence of the angular position, in a device in accordance with the invention.

The FIG. 10 is an exemplary representation of the real positions of shadow points on the sensor 4 with respect to positions constituting the fitted circle, in dependence of the angular position of the rotating element 1. The measurement unit of the vertical axis corresponding to positioning errors, is given in micrometers and the measurement unit of the horizontal axis corresponding to the angular position, is given in radians. It is obvious that the positioning errors are held at a very low level.

In the example illustrated in FIG. 2, the path followed by the virtual position of the light source 2a is a circle for a central arrangement of the light source 2. The angle α of the plane of the mirror 6 with respect to the perpendicular plane to the rotation axis A determines the virtual radius $R_{vi}$ of this circle.

The effective radius $R_{eff}$ of the device or encoder is the radius of the circular path followed by the shadow point with coordinates x,y.

The device according to the invention can rely on the following formula:

$$\frac{Reff}{Rvi} = \frac{d_1}{d_2}$$

where $d_1$ is the distance between the mask 5 and the sensor 4 and where d2 is distance between the mask 5 and the virtual light source 2a.

Since the effectice radius $R_{eff}$ is the radius of the circular trajectory of the image, which is equivalent to the radius of conventional rotary encoders, $R_{eff}$ determines the parameters of the said rotary encoder such as precision and maximal rotation speed due to the motion-blur limit.

Figure 11:
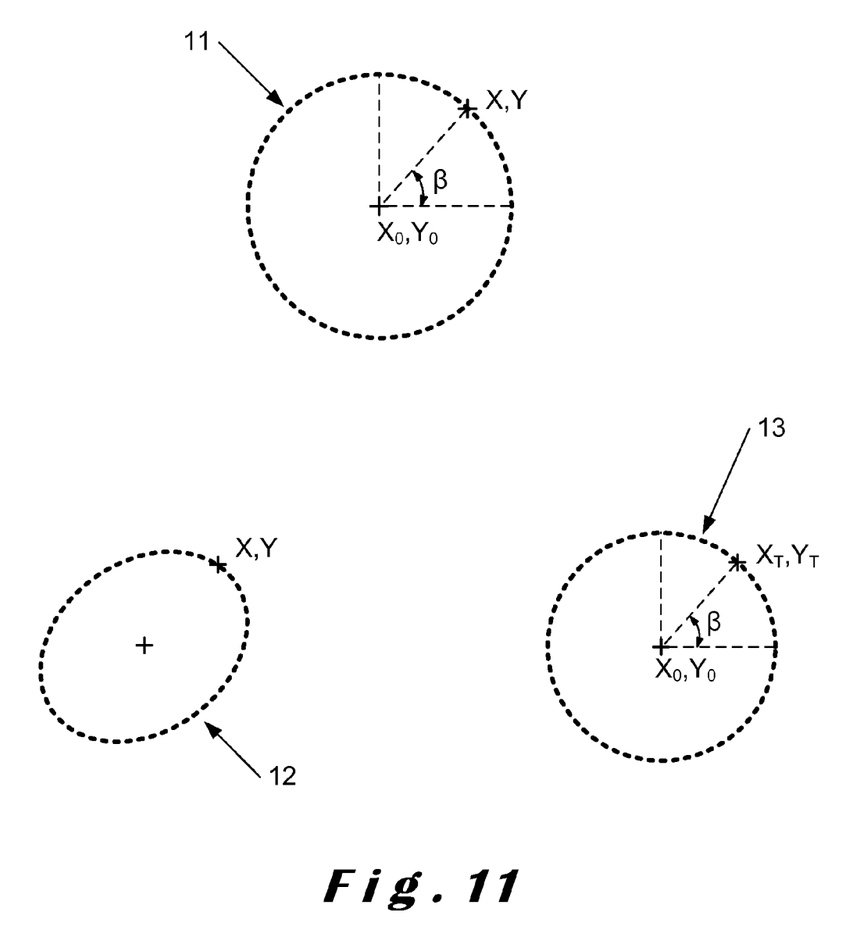
FIG. 11 is a schematic illustration of the steps of computing the angular position within the method in accordance with the invention.

The FIG. 11 is a schematic and an exemplary representation of some steps of computing the angular position β within the method in accordance with the invention.

The method for working out the angular position β of the rotating element 1, which is mounted in a fixed structure, consists in using at least one light source 2 emitting a light beam 3 in the direction of the fixed sensor 4 and a mask 5 altering the light beam 3.

The method consists in computing and processing the output signal of the sensor 4.

A step a) consists in positioning the light source with respect to the rotating element 1 and of the sensor 4 in a way so as to induce an interaction between the light beam 3 and the sensor 4 which depends on the angular position β of the rotating element 1.

A step b) consists in positioning on the path of the light beam 3, in a fixed position with respect to the sensor 4, the mask 5 which presents a repetitive two dimensional pattern of transparent and opaque areas, A step c) consists in detecting the image generated by the mask 5 on the sensor 4.

A step d) consists in processing the output signal of the sensor 4 for determining the position of the image or shadow on the sensor 4.

An additional step e) consists in computing the angular position β of the rotating element by using the position of the image or shadow on the sensor 4.

Within the frame of the method according to the invention, the processing and computing means are used to determine the center C of the fitted circle 11. This center C has the coordinates $x_0$ and $y_0$. The angular position β is then given by:

$$\beta = a\tan\left[\frac{y - y_0}{x - x_0}\right]$$

It may happen that the measured image or shadow points is an ellipse resulting of an axis A which is not orthogonal to the plane of the sensor 4. In such a case that the measured image or shadow point with coordinates x,y follows an elliptical path 12 on the sensor 4, the processing and computing means calculate transformed coordinates $x_T$ and $y_T$ corresponding to the coordinates of the point on a calculated circle 13.

The angular position β is then given by:

$$\beta = a\tan\left[\frac{y_T - y_0}{x_T - x_0}\right]$$

In an example of an end-of shaft encoder application, the device according to the invention allows to achieve the following indicated performances with the following indicated parameters:

grating pitch of the mask 5: 100 μm,
pixel area dimension in X and Y: 0.5 mm,
effective diameter: 1 mm,
resolution: 16 bits,
accuracy without calibration: 11 bits,
accuracy with auto-calibration: 15 bits,
maximal rotation speed: 3 000 000 rpm,
estimated achievable latency: 1 μs.

The method in accordance with the invention may comprise also calibration steps.

Figure 12:
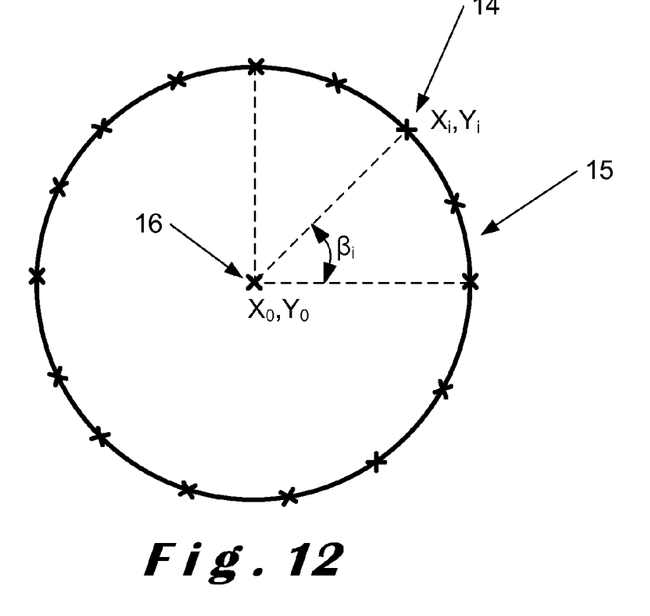
FIG. 12 is an illustration of a fitted circle used in calibration steps in the frame of the method in accordance with the invention.

A first calibration step consists in turning the rotating element 1 for more than one turn, with constant speed and measuring position 14 coordinates $X_i, Y_i$, and with constant sampling frequency. The following step consists in fitting a circle 15 and determining the coordinates $X_0, Y_0$ of the center 16 of this circle 15.

A second calibration step consists in determining the angular position $\beta_i$ corresponding to the measurements of the first step for one turn, with $1 < i < n$. The following step consists in calculating the measured angular position for each position measurement in using:

$$\beta m, i = a \tan\left[\frac{Yi - Y_0}{Xi - X_0}\right]$$

The following step consists in calculating the reference angular position $\beta_{r,i}$ for each measured point taking advantage of the constant speed turning and the constant sampling rate condition. The use of constant speed turning and constant sampling rate implies that the rotating element rotates with a constant angle between two consecutive measurements:

$$\beta_{r,i} = \beta_{r,0} + i \cdot \frac{360°}{n_c}$$

To compute the angular position $\beta r,i$, we find the value $n_c$ and $\beta r,0$ that minimize the rms value of differences between measured angular positions and reference angular positions:

$$\mathrm{rms}(\beta) = \sqrt{\frac{1}{n} \cdot \sum_{i=1}^{n} (\beta_{r,i} - \beta_{m,i})^2} \text{ and}$$

$$\beta_{r,0}, n_c = \mathrm{argmin}[\mathrm{rms}(\beta)];$$

We can note that $n_c$ can be integer or non-integer and is approximately equal to n, since the rotating element rotates for one turn.

Figure 13:
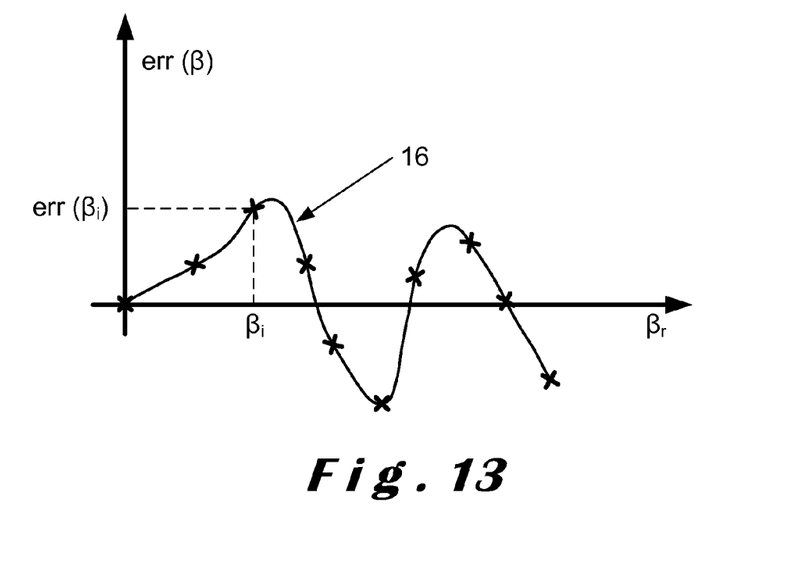
FIG. 13 illustrates an example of a polynomial fitted representation of the angular error with respect to the angular position used in the calibration steps in the frame of the method in accordance with the invention.

The following step consists in plotting the points $\mathrm{err}(\beta_i) = \beta_{r,i} - \beta_{m,i}$ as shown in FIG. 13 and performing a polynomial fit on this points in order to get the $\mathrm{err}(\beta i)$ continuous in $\beta$.

After these calibration steps, one can use the error function $\mathrm{err}(\beta_i)$ for error compensation for every new measurement point.

The angular position output of the calibrated sensor 4 is calculated as follows:

$$\beta_{c,j} = \beta_{m,j} - \mathrm{err}(\beta_{m,j}).$$

The device according to the invention can also find applications in cases where the effective radius is extended to cover a radius range in which more than one sensor 4 can be used. One kind of sensor 4 can so fit with a large number of different encoders.

Naturally, the present invention can be subjected to numerous variations as to its implementation. Although several embodiments and implementations are described above, it should be understood that it is not conceivable to identify exhaustively all possible variants. It is naturally possible to envisage replacing any of the means described or any of the steps described with equivalent means or an equivalent step without going beyond the scope of the present invention.

What is claimed is:

1. A method for working out the angular position of a rotating element which is mounted in a fixed frame, consisting in using at least one light source emitting a light beam in the direction of a fixed sensor and using processing and computing means for delivering an output signal of the sensor, consisting in:
    a) arranging the light source with respect to the rotating element and of the sensor in a way so as to induce an interaction between the light beam and the sensor which depends on the angular position of the rotating element,
    b) arranging on the path of the light beam, in a fixed position with respect to the sensor, a mask which presents a repetitive two dimensional pattern of transparent and opaque areas,
    c) detecting the image or shadows casted by the mask on the sensor,
    d) processing the output signal of the sensor for determining the position of the image or shadows on the sensor, and
    e) computing the angular position of the rotating element by using the position of the image or shadows on the sensor.

2. The method of claim 1, consisting in using a fixed light source and a reflection of the light beam on a slanted and polished end of the rotating element.

3. The method of claim 1, consisting in using a fixed light source and a reflection of the light beam on a mirror which is fixed in a tilted position with respect to the rotation axis on a end of the rotating element.

4. The method of claim 1, consisting in using two fixed light sources emitting each a light of different color, the end of the rotating element, which faces the mask, presenting a slanted and polished surface for reflecting the two beams of light.

5. The method of claim 1, consisting in using one mobile light source arranged in an off-centered position on a disc which is integral in rotation with the rotating element and of driving into rotation the disc in a plane parallel to the mask.

6. The method of claim 1, consisting in using two mobile light sources emitting each a light of different color on a disc which is integral in rotation with the rotating element, the light sources being fixed in an off-centered and diametrically opposite positions and of driving into rotation the disc in a plane parallel with the mask.

7. The method according to claim 1, consisting in using an absolute code integrated in the repetitive two dimensional pattern, in order to identify each position on the mask.

8. A Device for carrying out the method according to claim 1 and providing the angular position of a rotating element which is able to rotate in a fixed frame, comprising at least one point-light source, emitting a light beam, optical transmission means localized on the path of the light beam and influencing the light beam in dependence of the angular position of the rotating shaft, a sensor comprising a pixel array which is hit by the influenced light beam and processing and computing means for providing the angular position of the rotating element by using the output signal of the sensor,
    wherein the optical transmission means comprise:
        a mask which presents a repetitive two dimensional pattern of transparent and opaque areas and which is arranged in a spaced and fixed position covering the sensor and which is parallel to the sensor, in order to generate on the sensor an image or shadows of the mask, and
        communication means for providing the processing and computing means with the output signal of the sensor in order to determine the position of the image or shadows of the mask, and to compute the angular position of the rotating element.

9. The device of claim 8, wherein the transparent areas of the mask are constituted by perforations.

10. The device of claim 9, wherein the two dimensional repetitive pattern comprises an absolute code for identifying each position on the mask.

11. The device of claim 8, wherein the two dimensional repetitive pattern comprises an absolute code for identifying each position on the mask.

12. The device of claim 8, wherein the light source is arranged in a fixed position on the mask, aligned with the rotation axis A of the rotating element and facing a slanted and polished end of the rotating element for reflecting the light beam.

13. The device of claim 8, wherein at least the light source is arranged in at least one fixed position in the plane of the sensor and nearby the sensor, the end of the rotating element facing the mask, presenting a slanted and polished surface for reflecting the light beam.

14. The device of claim 13, comprising two light sources, each light source emitting a light of different color, each light source being arranged in a fixed an off-centered position in the plane of the sensor, nearby one side of the sensor, the end of the rotating element which faces the mask, presenting a slanted and polished surface for reflecting the two beams of light.

15. The device of claim 8, wherein comprising two light sources, each light source emitting a light of different color, each light source being arranged in a fixed an off-centered position on the mask, the end of the rotating element which faces the mask, presenting a slanted and polished surface for reflecting the two beams of light.

16. The device of claim 8, wherein the light source is arranged in a fixed position on the mask, aligned with the rotation axis A of the rotating element and facing a tilted mirror fixed on the end of the rotating element for reflecting the light beam.

17. The device of claim 8, comprising one mobile light source arranged in fixed, off-centered position on a disc which is orthogonal to the axis A of the rotating element, the disc being integral in rotation with the rotating element and parallel to the plane of the mask.

18. The device of claim 8, comprising two light sources, each light source emitting a light of different color, the light sources being arranged in fixed, off-centered and diametrically opposite positions, on a disc which is integral in rotation with the rotating element and which is parallel with the plane of the mask.

19. The device according to claim 8, wherein the communication means, the computing means and the processing means are integrated in the sensor.

\* \* \* \* \*